United States Patent
Oehmichen et al.

(10) Patent No.: US 11,702,328 B2
(45) Date of Patent: Jul. 18, 2023

(54) APPARATUS FOR FILLING A VESSEL WITH A FILLING PRODUCT

(71) Applicant: KRONES AG, Neutraubling (DE)

(72) Inventors: Thomas Oehmichen, Neutraubling (DE); Christina Laumer, Neutraubling (DE); Johanna Justl, Neutraubling (DE); Frank Winzinger, Neutraubling (DE); Stefan Hoeller, Neutraubling (DE); Erwin Engel, Neutraubling (DE); Christoph Mieko, Neutraubling (DE); Holger Mueller, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/530,820

(22) Filed: Nov. 19, 2021

(65) Prior Publication Data

US 2022/0162049 A1    May 26, 2022

(30) Foreign Application Priority Data

Nov. 20, 2020    (DE) ...................... 10 2020 130 740.3

(51) Int. Cl.
*B67C 3/20*    (2006.01)
*B01F 35/80*    (2022.01)
(Continued)

(52) U.S. Cl.
CPC .............. *B67C 3/208* (2013.01); *B01F 23/45* (2022.01); *B01F 25/54* (2022.01);
(Continued)

(58) Field of Classification Search
CPC ......... B67C 3/208; B67C 3/001; B67C 3/007; B67C 3/24; B67C 3/02; B01F 23/45;
(Continued)

(56) References Cited

U.S. PATENT DOCUMENTS 5,908,651 A * 6/1999 Gustavsson ............. B65B 55/14
53/433
6,391,122 B1 * 5/2002 Votteler .................. B08B 9/032
134/28

(Continued)

FOREIGN PATENT DOCUMENTS

DE    102016105524        9/2017
DE    102016224562 A1    6/2018
(Continued)

OTHER PUBLICATIONS

German Search Report dated Feb. 23, 2022 in corresponding German application No. 10 2020 130 740.3, five pages.
(Continued)

*Primary Examiner* — Nicolas A Arnett
(74) *Attorney, Agent, or Firm* — Haynes and Boone, LLP

(57) ABSTRACT

An apparatus for filling a vessel with a multicomponent filling product includes a filler having at least one filling unit set up to introduce the filling product into the vessel, and a filler tank set up for intermediate buffering of the filling product and in fluid connection with the filling unit via a product conduit to supply the filling unit with the filling product; and a mixer set up to blend the filling product from at least two filling product components, wherein the mixer has a circulation conduit; and the mixer has at least one dosage branch set up to introduce one filling product component into the circulation conduit, wherein the mixer has a heat exchanger set up to adjust the temperature of the filling product in the circulation conduit.

20 Claims, 5 Drawing Sheets

(51) Int. Cl.
*B01F 35/221* (2022.01)
*B01F 35/21* (2022.01)
*B01F 35/93* (2022.01)
*B01F 25/54* (2022.01)
*B01F 23/45* (2022.01)
*B67C 3/00* (2006.01)
*B67C 3/24* (2006.01)
*G05D 11/00* (2006.01)
*G05D 11/13* (2006.01)
*B01F 35/90* (2022.01)
*B01F 101/14* (2022.01)
*B67C 3/02* (2006.01)
*A23L 2/54* (2006.01)
*A23L 2/56* (2006.01)
*A23L 2/60* (2006.01)

(52) U.S. Cl.
CPC .... *B01F 35/21112* (2022.01); *B01F 35/2213* (2022.01); *B01F 35/2217* (2022.01); *B01F 35/80* (2022.01); *B01F 35/93* (2022.01); *B67C 3/001* (2013.01); *B67C 3/007* (2013.01); *B67C 3/24* (2013.01); *G05D 11/008* (2013.01); *G05D 11/138* (2013.01); *A23L 2/54* (2013.01); *A23L 2/56* (2013.01); *A23L 2/60* (2013.01); *B01F 2035/98* (2022.01); *B01F 2101/14* (2022.01); *B67C 3/02* (2013.01)

(58) Field of Classification Search
CPC ............... B01F 25/54; B01F 35/21112; B01F 35/2213; B01F 35/2217; B01F 35/80; B01F 35/93; B01F 2035/98; B01F 2101/14; G05D 11/008; G05D 11/138; A23L 5/54; A23L 5/56; A23L 5/60
See application file for complete search history.

(56) References Cited

U.S. PATENT DOCUMENTS

| | | | | |
|---|---|---|---|---|
| 6,599,546 | B2* | 7/2003 | Palaniappan | A23L 2/48 |
| | | | | 99/275 |
| 8,460,733 | B2* | 6/2013 | Wu | B67C 3/02 |
| | | | | 141/89 |
| 11,180,356 | B2* | 11/2021 | Muszinski | B67C 3/28 |
| 11,347,245 | B2* | 5/2022 | Choubak | G05D 11/137 |
| 2010/0300577 | A1* | 12/2010 | Wagner | B67C 3/007 |
| | | | | 141/237 |
| 2012/0147694 | A1* | 6/2012 | Engel | G05D 11/132 |
| | | | | 261/150 |

FOREIGN PATENT DOCUMENTS

| | | |
|---|---|---|
| EP | 0602387 A1 | 6/1994 |
| WO | WO 2019/043240 | 3/2019 |

OTHER PUBLICATIONS

Extended European Search Report dated Apr. 13, 2022 from corresponding European application No. EP 21209178.9, 10 pages.

* cited by examiner

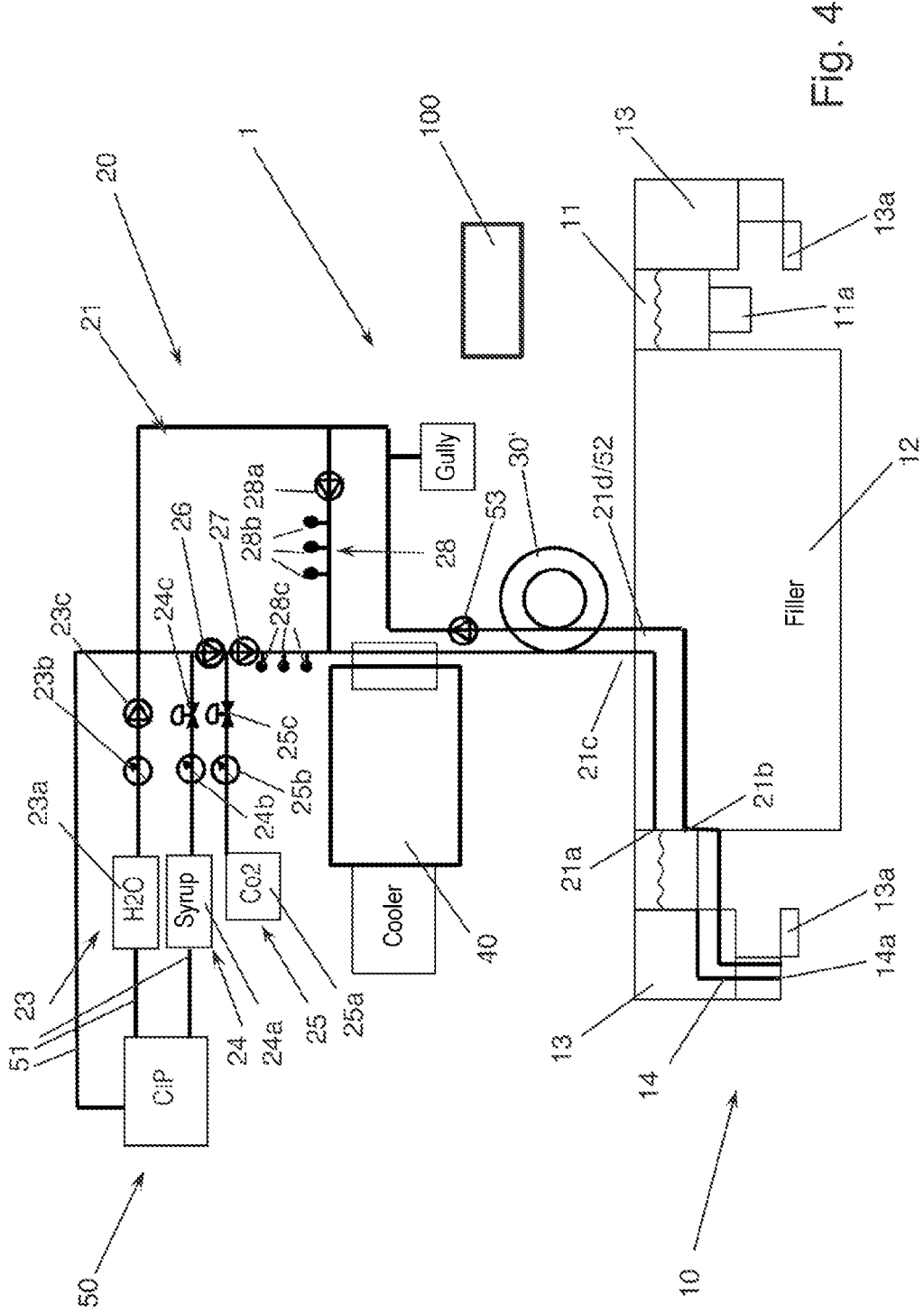

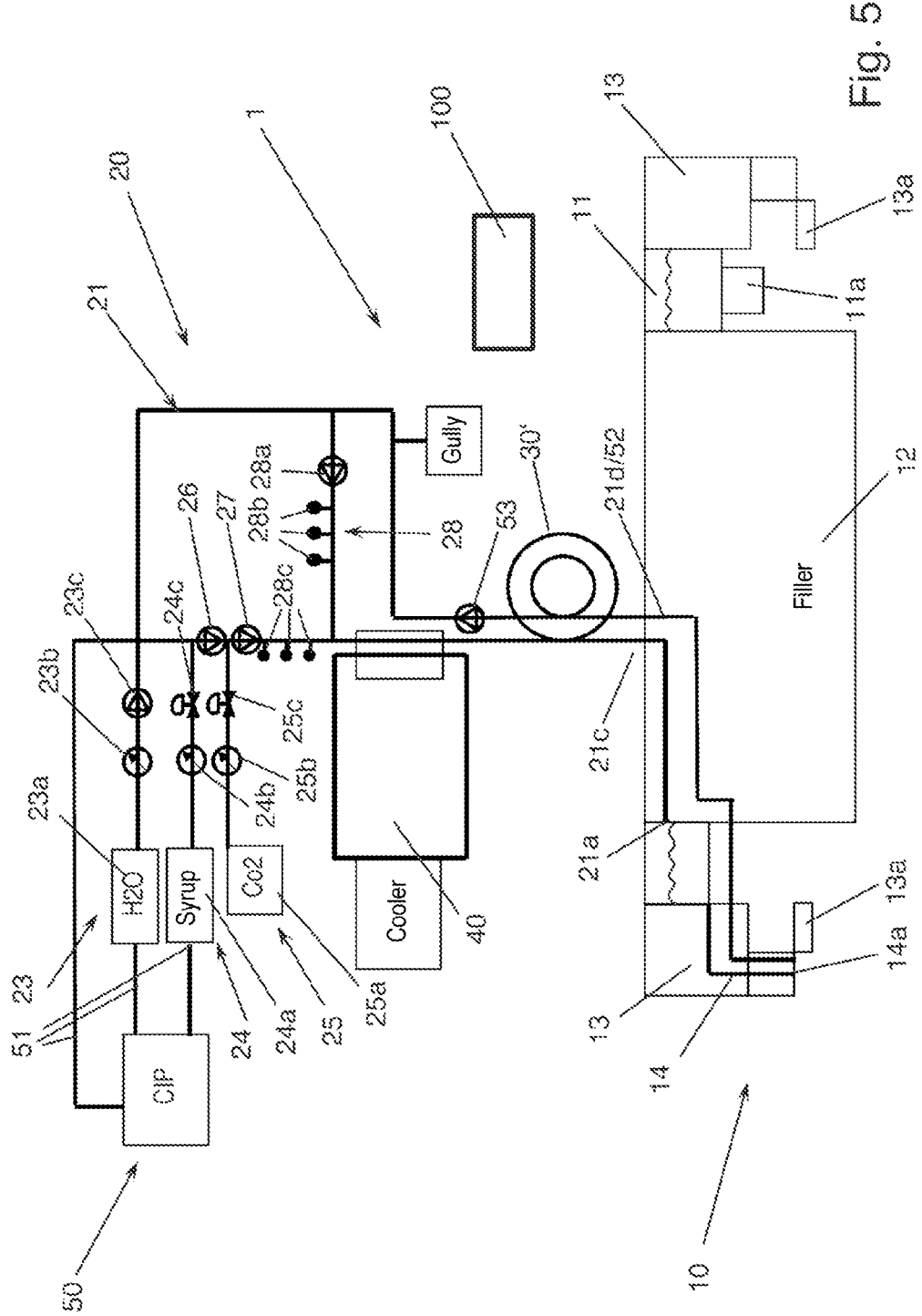

APPARATUS FOR FILLING A VESSEL WITH A FILLING PRODUCT

CROSS-REFERENCE TO RELATED APPLICATIONS

This application claims priority from German Patent Application No. DE 10 2020 130 740.3, filed on Nov. 20, 2020 in the German Patent and Trademark Office, the disclosure of which is incorporated herein by reference in its entirety.

BACKGROUND

Technical Field

The present invention relates to an apparatus for and to a method of filling a vessel with a multicomponent filling product. The apparatus is employed especially in a drinks bottling plant, for instance for bottling of soft drinks, mixed beer drinks, juices and the like.

Related Art

In drinks bottling plants, product tanks are used to accommodate and intermediately store the product to be bottled or components thereof in multiple places. For example, it is known that the product to be bottled can be blended in a mixer, for which a base and/or syrup is typically mixed into a product water stream. The filling product thus produced is accommodated in a product tank referred to as "buffer tank" and mixed further therein, before being supplied to a filler tank that supplies a multitude of filling valves for introduction of the filling product into corresponding vessels.

The technological separation between mixer and filler and the use of individual tanks result in good mixing of the filling product, but disadvantages are that the overall plant is complex from an engineering point of view—this relates to the communication between the mixer and the filler as well—and maintenance is complex. In the case of a product changeover, the buffer tank of the mixer has to be cleaned, which means the product changeover is time-consuming.

Increasing efforts are therefore apparent in the technical field to integrate the mixer and the filler in terms of their construction. For example, it is possible to feed the filling product from the buffer tank to the filling valves without a further intervening filler tank. An apparatus of this kind is apparent from WO 2019/043240 A1. Alternatively, it is possible to dispense with a buffer tank in the mixer, in which case the filler tank assumes the function of the buffer tank. Such an apparatus is described in DE 10 2016 105 524 A1.

However, the engineering integration of mixer and filler is associated with technical problems which, especially in the case that a buffer tank in the mixer is dispensed with, relate to the constancy of quality of the product to be bottled. For instance, mixing accuracy and homogeneity of the filling product can suffer from the truncated production route.

SUMMARY

An improved apparatus for filling a vessel with a multicomponent filling product, for example in a drinks bottling plant, especially to improve the mixing accuracy in the production of the filling product and the homogeneity thereof is described herein according to various embodiments.

The apparatus according to the invention serves to fill containers with a multicomponent filling product according to certain embodiments. It is employed, in various embodiments, in a drinks bottling plant, for example for bottling of soft drinks, mixed beer drinks, juices and the like.

The filling product comprises at least two filling product components, with one of the components for linguistic distinction also being referred to herein as "base liquid" and functioning, in some embodiments, as the main component in terms of amount.

As well as the bottling of the filling product, the apparatus is set up to mix the filling product components, and in this respect takes on at least part of the process of production of the filling product to be bottled.

The base liquid is, in several embodiments, water or milk or a water-, milk- and/or whey-containing liquid. One or more further dosage components may, for example, comprise a syrup, fruit flesh-containing liquids, pulps, flavourings etc. In addition, the drink may be mixed with $CO_2$.

The apparatus comprises a filler having at least one filling unit set up to introduce the filling product into the vessel, and a filler tank, which may be in the form of an annular tank, set up for intermediate buffering of the filling product and in fluid connection with the filling unit via a product conduit, in order to supply the filling unit with the filling product.

In general, a multitude of filling units is provided, which, in the case of a carousel-type design, are arranged at the outer circumference of a filler carousel. More particularly, the filler carousel may rotate continuously during regular production operation.

When terms such as "filling unit", "filling valve", "product conduit", "vessel" and others are used in the singular, this is usually done for the sake of linguistic simplicity. The plural is also included, unless it is ruled out explicitly or for technical reasons.

The apparatus also includes a mixer set up to blend the filling product from multiple filling product components.

The filler and the mixer are components that were conventionally designed as structurally and technologically separate machines with dedicated buffer vessels and are now becoming more and more integrated. For this purpose, the mixer has a circulation conduit in fluid connection with the filler tank at at least one tank inlet and at least one tank outlet, and is set up to feed the filling product via the tank inlet to the filler tank and to draw it off from the filler tank via the tank outlet, by means of which the filling product is circulated in regular operation. Regular operation is considered to be the process of mixing and bottling of the filling product by means of the apparatus.

Guiding of the filling product in a circulation conduit can be conducted by means of a pump.

The mixer has at least one dosage branch, in several embodiments, at least two dosage branches, each set up to introduce one filling product component into the circulation conduit.

The dosage branches may each comprise a dosage reservoir that holds the corresponding dosage component. However, the dosage component, especially the main component, may also be provided via a (permanent) feed.

One dosage branch, more than one dosage branch or all dosage branches, in various embodiments, each include a flowmeter set up to measure the volume flow rate being conveyed or transported in the corresponding dosage branch, and to provide the data to a controller for the open-loop or closed-loop control of the apparatus.

Also provided, in some embodiments, are pumps, control valves or other technical means of transporting and/or metering the corresponding dosage component into the circulation conduit in the dosage branches.

In the case of just one dosage branch opening into the circulation conduit, it is possible to provide a preliminary mixing chamber into which multiple dosage sub-branches open, in which case the preliminary mixing chamber is connected to the circulation conduit via the one dosage branch.

The statements made so far with regard to the dosage branch are applicable to the dosage sub-branches (connection to one dosage reservoir each, one flowmeter each . . . ).

In the preliminary mixing chamber, it is possible by means of one or more sensors disposed in the preliminary mixing chamber to ascertain a density and/or a $CO_2$ concentration and/or a Brix value and/or a sugar concentration. They can be ascertained continuously. It is possible that the values ascertained are passed onward to a controller which, in the event of finding of a variance from a target value, implements a correction where an additional addition of only particular components is conducted, or the addition flow rate thereof is altered. The preliminary mixing chamber may also merely be a pipe.

The term "dosage component" is used here in a general manner and includes liquids, for example water, syrup, pulp etc., and likewise gases, for example $CO_2$.

In some embodiments, the mixer, viewed in the direction of gravity, is disposed at least partly above the filler.

Such a higher arrangement of the mixer with respect to the filler has the result that the filling product components can be dosed into the filler tank with higher accuracy since the dosage need not be effected against the pressure in the filler tank. For the same reason, it is possible to minimize product losses. The facilitation of blending, especially in the case of the integral design with truncated production route, has a positive effect on homogeneity and hence quality of the filling product.

The openings of one dosage branch, more than one dosage branch or all dosage branches into the circulation conduit are, in certain embodiments, disposed above a regular fill level of the filler tank, by means of which the effects mentioned can be optimized further. The regular fill level is considered to be a particular fill level in the filler tank that is optimal for regular operation.

The openings of one dosage branch, more than one dosage branch or all dosage branches into the circulation conduit are, in one embodiment, disposed above the filler tank in order to assure the effects mentioned irrespective of the fill level in the filler tank.

The spatial terms "above", "below" and the like are based herein on the direction of gravity and are defined unambiguously by the intended use of the apparatus. The terms "before", "after" and the like, if they serve to describe the conduit system, are based on the flow direction of the filling product; in other words, the term "before" means upstream and the term "after" means downstream. In the case of a circular conduit like the circulation conduit mentioned, the relative positions thus defined are based on the shortest route.

The mixer is, in certain embodiments, in a buffer-free design and is in fluid connection with the filler tank in a buffer-free manner, which means that a dedicated buffer in the mixer is dispensed with. This achieves a further integrated, particularly efficient construction of the apparatus.

In addition, the total filling product volume that is intermediately buffered or held is reduced, which results in a further increase in efficiency of the apparatus since, at the end of filling or in the event of a product changeover, less filling product, if any at all, has to be discarded. In addition, the apparatus can be controlled more easily by open-loop or closed-loop control, since it is possible to avoid coordination or monitoring of fill heights of multiple buffers that interact with one another between the mixer and the filler.

What is understood here by "buffer-free" is that, in the environment thus characterized, there is no dedicated buffer apparatus that enables the buffering accommodation of filling product, for example during breaks in production or in the event of faults in the filling apparatus. More particularly, the buffer apparatus is not understood to mean the conduits present, through which the filling product flows and which, during filling operation, are filled with the filling product either over their entire cross section or at least over part of their cross section. Instead, a buffer apparatus is understood to mean a dedicated buffer vessel envisaged as such—i.e. a tank, vessel or the like—that provides a corresponding buffer volume. This means that the buffer apparatus can accommodate a substantial amount of additional filling product which is obtained in breaks in production or in the event of plant faults and is not accepted directly by the filling apparatus. Moreover, the terms "buffer-free", "buffer" etc. relate to the filling product; in other words, any reservoirs in the mixer for holding of filling product components to be mixed are not included.

According to various embodiments of the invention, the mixer has a heat exchanger set up to adjust the temperature of the filling product in the circulation conduit.

In certain embodiments, the heat exchanger is disposed downstream with respect to the inlets of the dosage branches into the circulation conduit, i.e. in an arm of the circulation conduit that feeds into the filler tank, which is also referred to herein as "circulation feed". In this way, it is possible to utilize the blending of the filling product in the mixer simultaneously for adjusting the temperature of the filling product. In one or more embodiments, the heat exchanger is set up to cool the filling product, which improves the uptake of $CO_2$ in the case of carbonated filling products.

Alternatively, the heat exchanger may be used to heat the filling product, for example in the case of hot bottling.

If particular drinks are bottled either when warm or cold in a production plant, it is possible to use the same heat exchanger for adjusting the temperature of both. For this purpose, the secondary circuit in which the heat exchange carrier medium is conducted may be connected either to a cooler or to a heater, in some embodiments, via a suitable valve connection.

Among the dosage branches, a first dosage branch may be set up for the feeding of a main component, which may be water. The first dosage branch may have a supply pump in order to actively supply the main component to the circulation conduit. The supply pump is actuated by the controller. The supply pump can take the form of a centrifugal pump. However, according to the application, it may be possible to dispense with the supply pump in the first dosage branch and replace it, for example, with a proportional valve, closed-loop control valve or shutoff valve that controls the feeding of the corresponding component.

A second dosage branch may be set up for the feeding of a secondary component, for example syrup, pulp, flavouring etc. The second dosage branch may have a dosage valve, implemented, for example, in the form of a proportional valve, closed-loop control valve or shutoff valve, in order to supply the secondary component to the circulation conduit in the desired amount.

The dosage valve is actuated by the controller. However, according to the application, it may be possible to dispense with the dosage valve and to replace it, for example, with a dosage pump or supply pump. It is possible to provide further dosage branches for the feeding of one or more further secondary components.

A dosage valve can be used to dose a component without a pump, for example by means of gas pressure; this is advantageous especially in the case of pulp and/or components containing pieces of fruit or generally including solids, since these are subject to less damage by virtue of pure gas conveying.

A third dosage branch may be set up for the feeding of a gas component, especially $CO_2$ for carbonation of the filling product. The third dosage branch may include a dosage valve, implemented, for example, in the form of a proportional valve or shutoff valve, in order to feed the gas component to the circulation conduit in the desired amount. The dosage valve is actuated by the controller.

It should be pointed out that the expressions "first", "second", "third" dosage branch do not imply any number, sequence or prioritization, but serve merely for linguistic distinction. For example, it is possible that the second dosage branch is omitted and only the first and third dosage branches are provided, for production of carbonated water. It is also possible, for example, for only two second dosage branches to be provided.

That dosage branch which introduces the main component, if present, can open into the circulation conduit upstream of a dosage branch that meters in a secondary component or a gas component. In addition, that dosage branch which meters in a gas component can open into the circulation conduit downstream of those dosage branches which introduce a liquid filling product component. "Downstream" here means before reaching a tank inlet.

The circulation conduit is, in some embodiments, in fluid connection with the filler tank at multiple tank inlets and at multiple tank outlets, and is thus set up to supply the filling product to the filler tank at multiple points and to draw it off from the filler tank at multiple points. In this way, the mixing of the filling product can be accelerated and the homogeneity of the filling product can be improved, which is advantageous especially in association with the integral construction of the apparatus described here.

The mixer, in various embodiments, has a circulation pump which is disposed in the circulation conduit and is set up to cause the filling product to circulate, or to circulate it, in the circulation conduit. The circulation pump is, in certain embodiments, disposed upstream of the inlets of the dosage branches into the circulation conduit, i.e. in an arm of the circulation conduit that leads away from the filler tank, which is also referred to herein as "circulation outlet".

The circulation pump controls the delivery output of the filling product in the circulation conduit, by means of which it is possible to control the mixing in the mixer and filler tank. The circulation pump can optionally be bypassed by means of a bypass valve.

In order to facilitate the mixing of the components, internals, projections or other measures that alter the cross section of the pipeline may be provided in the circulation conduit as well as the pump. These are especially disposed between dosage branches and tank inlet.

The mixer, in some embodiments, has a pressure control pump disposed downstream of the inlets of the dosage branches into the circulation conduit. The pressure control pump is, in various embodiments, implemented as a centrifugal pump with a control valve for lowering the pressure. The pressure control pump is, in some embodiments, a displacement pump, especially connected to a $CO_2$ dosage.

It is possible for further pumps to be provided in the circulation conduit, for example a further high-power pump for control of the delivery output, installed between the openings of the first and second and/or second and third dosage branches.

The mixer, in one embodiment, has one or more sensors, especially for measurement of the composition of the filling product in the circulation conduit and/or of the volume flow rate, which are disposed downstream of the inlets of the dosage branches into the circulation conduit. For example, it is possible to undertake a BRIX measurement in the filling product and a volume flow rate measurement for increasing the mixing accuracy.

Alternatively or additionally, sensors may be installed elsewhere in the mixer, for example upstream of the first dosage branch and/or between two dosage branches and/or directly in the filler tank.

The mixer, in one or more embodiments, has a measurement branch that branches off upstream of the inlets of the dosage branches into the circulation conduit, i.e. in the circulation outlet, and, bypassing the dosage branches, opens back into the circulation conduit downstream of the inlets of the dosage branches, i.e. into the circulation inlet.

The measurement branch, in several embodiments, has one or more sensors, for example for measurement of the composition of the filling product and/or the volume flow rate. The measurement branch, in various embodiments, has a measurement branch pump set up to adjust the volume flow rate in the measurement branch, especially to keep it constant.

All sensors are in communication with the controller in order to provide information for the closed-loop or open-loop control of the apparatus.

The controller already addressed is, in some embodiments, in communication with the filler and the mixer. The controller is especially set up to actuate the filler units, i.e. to switch the corresponding valves for introduction of the filling product into the vessels.

The controller is, in various embodiments, also in communication with other components of the apparatus, for example sensors, valves, pumps etc., in order to control the processes performable with the apparatus by closed-loop or open-loop control. The controller may be centralized or decentralized, may be part of Internet-based and/or cloud-based applications, or may be implemented in some other way, and may possibly have access to databases. The controller can communicate with the corresponding components in a wireless or wired manner. The controller is, in one embodiment, set up to separately add up filling product components and/or other filling product parameters, for example the BRIX value of the filling product, and to control the introduction of the filling product components from the dosage branches into the circulation conduit in such a way that the sum totals of the filling product components or filling product parameters correspond to an intended ratio or intended target values.

For example, in a working example, the amount of water and the BRIX value in the filling product are added up separately, resulting in formation of different accounts for the individual filling product components or filling product parameters.

The amount of syrup as an illustrative secondary component is then controlled such that the sum total corresponds to the desired ratio. In particular time intervals or on attainment of a particular sum total, it is possible to trim the respective sum totals proportionately in accordance with the desired ratio. Such register control distinctly increases the measurement accuracy since the differential for the closed-loop control could otherwise become very small relative to the sum total, as a result of which changes may possibly no longer be recognized.

The controller is, in certain embodiments, set up to undertake pressure control in the filler tank adapted to the fill level in the filler tank, such that the pressure in the filler tank is defined by the controller. The controller, in several embodiments, implements pressure control in the filler tank adapted to the fill level in such a way that the pressure always remains the same even in the case of a variable level or fill level. Since the pressure tank in the present integrated design of the apparatus is the only buffer vessel for the filling product, and the fill level in the filler tank can vary for various reasons, for instance in the event of a stoppage when the product quality is outside the formulation limits, at the end of production or when the filler tank runs dry, it is possible in this way to ensure dispensing of constant quality.

Alternatively or additionally, it is possible to undertake level-controlled filling, i.e. open- or closed-loop control of the filling rate depending on the respective level in the vessel.

In order to facilitate emptying of the filler tank, the controller may be set up to exhaust the circulation conduit with the main component, especially water, which can minimize product losses at the end of production.

The apparatus, in one embodiment, has a CIP device set up to provide a CIP medium and to circulate it for performance of a CIP treatment, such that the filling product-guiding surfaces of the apparatus come into contact with the CIP medium.

Any CIP treatment takes place outside regular operation. The CIP ("cleaning-in-place") method and SIP ("sterilization-in-place") method permit cleaning or sterilization of the mixer and the filler, with essentially no need for disassembly of the components and surfaces that were in contact with the filling product or the intermediates and auxiliaries.

For example, the filling units need not be deinstalled for the cleaning or sterilization, but rather are purged or steamed in the installed state with a cleaning medium or sterilization medium. The SIP method is encompassed by the CIP method herein for linguistic simplicity, i.e. the CIP method includes a cleaning and/or sterilization.

The CIP medium, in one embodiment, comprises water and/or alkali, for instance sodium hydroxide solution, and/or acid, for instance nitric acid and/or peracetic acid, and/or a different detergent and/or disinfectant. It is also possible to utilize alcohols, for instance ethanol, alone or in combination as treatment medium. It is also possible to use steam or hot water on its own or as carrier for a sterilization.

The filling units are, in some embodiments, equipped with CIP caps that are set up on the container side and as required for closure of the outlets of the filling units. The CIP medium is then, in certain embodiments, recycled via a CIP return conduit from the filling units to the CIP device.

The circulation pump is, in various embodiments, set up to convey the CIP medium, by means of which the circulation pump can be utilized synergetically for the regular operation and the CIP treatment. Alternatively or additionally, the CIP medium can be conveyed using further components of the mixer and/or filler—pumps, valves, conduits etc. The circulation outlet of the mixer is, in one embodiment, utilized simultaneously as CIP return conduit.

The CIP conduit(s) and/or CIP return conduit(s) may be equipped with CIP sensors in order to monitor the composition of the CIP medium.

In one or more embodiments, the filler is designed as a carousel-type machine and the mixer to be stationary relative to the filler, wherein the circulation conduit is guided by means of an at least two-stage rotary distributor from the mixer to the filler tank of the filler and vice versa.

Especially when the circulation outlet of the mixer is utilized simultaneously as CIP return conduit, the rotary distributor may be designed not as a three-stage rotary distributor but as a two-stage rotary distributor.

More particularly, a source for $CO_2$ may be connected both to the circulation conduit and to a channel for pre-pressurization of the vessels to be filled.

A method of filling a vessel with a multicomponent filling product, for example in a drinks bottling plant, includes: blending the filling product from at least two filling product components in a mixer, wherein the mixer has a circulation conduit in fluid connection with a filler tank of a filler at at least one tank inlet and at at least one tank outlet; introducing the blended filling product via the tank inlet of the circulation conduit into the filler tank, intermediately buffering the filling product in the filler tank and drawing off the filling product via the tank outlet from the filler tank, by means of which the filling product is circulated in regular operation; and feeding the filling product from the filler tank to a filling unit via a product conduit and introducing the filling product via the filling unit into the vessel; and adjusting the temperature of the filling product in the circulation conduit by means of a heat exchanger.

The features, technical effects, advantages and working examples that have been described in relation to the apparatus are analogously applicable to the method.

Further advantages and features of the present invention are apparent from the description of working examples that follows. The features described therein may be implemented on their own or in combination with one or more of the features detailed above, provided that the features are not mutually exclusive. The description of working examples that follows is made with reference to the accompanying figures.

BRIEF DESCRIPTION OF THE FIGURES

Further embodiments of the invention are elucidated in detail by the description of the figures that follows.

FIG. 4 is a schematic diagram of an apparatus for filling vessels with a multicomponent filling product in a further working example; and FIG. 5 is a schematic diagram of an apparatus for filling vessels with a multicomponent filling product in a further working example.

DETAILED DESCRIPTION

Figure 1:
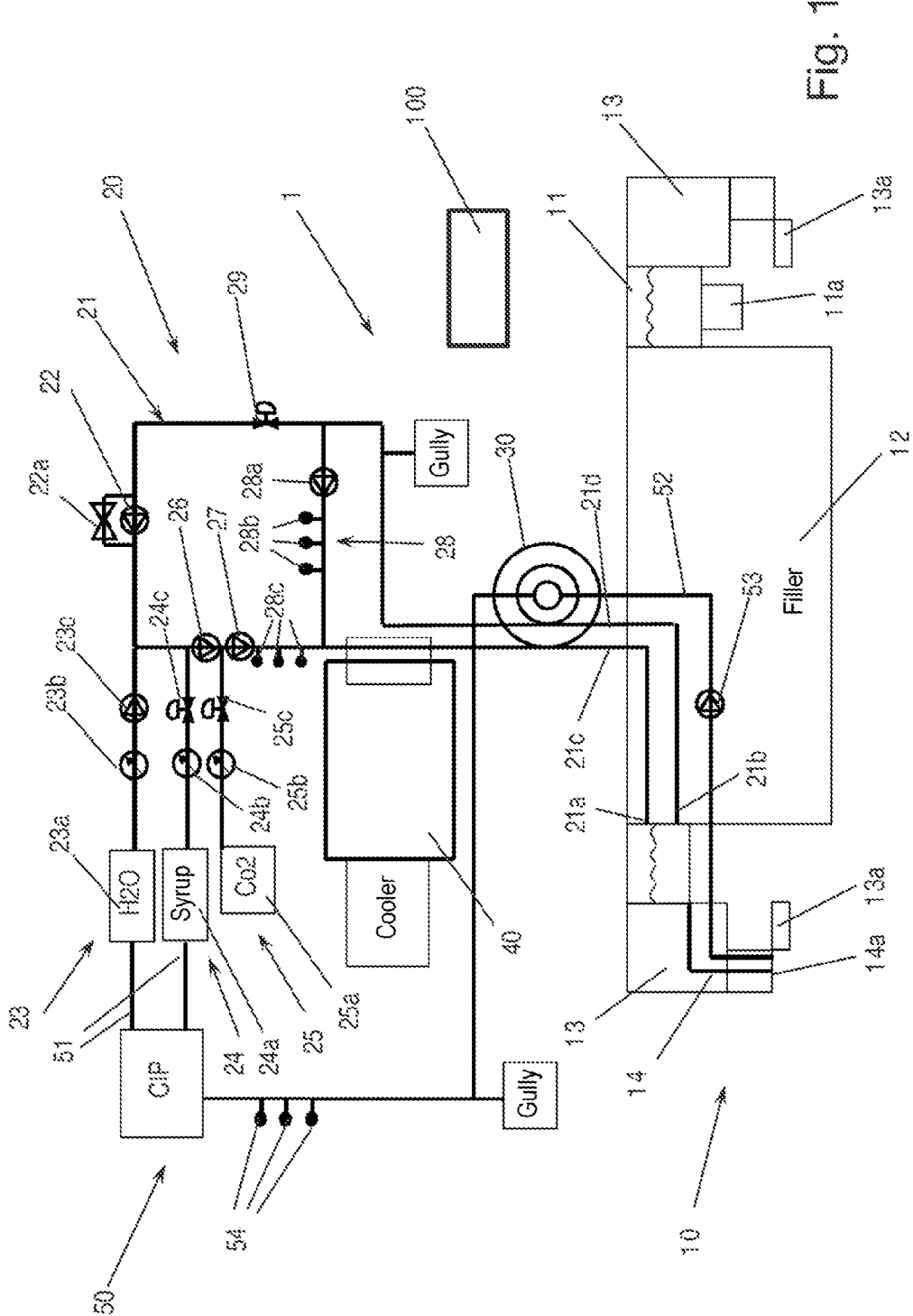
FIG. 1 is a schematic diagram of an apparatus for filling vessels with a multicomponent filling product in one working example.

There follows a description of working examples with reference to the figures. Elements that are the same, similar or have the same effect in the different figures are given identical reference numerals here, and repeated description of these elements is dispensed with to some degree in order to avoid redundancy.

FIG. 1 shows a schematic diagram of an apparatus 1 for filling one or more vessels (not shown in the figures) with a multicomponent filling product in one working example.

The apparatus 1 has a filler 10 with a filler tank 11, in one embodiment designed as an annular tank. More particularly, the filler 10 may be implemented as a carousel-type machine, in which case the filler tank 11 in the case of the annular design shown in FIG. 1 is, in one or more embodiments, on a rotatable filler carousel 12 on the circumferential side. However, the filler tank 11 may also be implemented as a central tank or in some other way.

The filler tank 11 serves to accommodate and mix the filling product, and supplies multiple filling units 13 set up to introduce the filling product into the vessels. For this purpose, a vessel to be filled is positioned beneath a corresponding filling unit 13. During the filling process, the vessel opening may be in pressure-tight contact with the filling unit 13, by means of which the filling process is performable as a backpressure process or reduced pressure process. However, the filling unit 13 may also be designed as a free jet valve, such that the filling product is introduced into the opening of the vessel after passing across a free jet region. The vessel to be filled is held on or beneath the filling unit 13 during the filling by means of a vessel holder having, for example, a holding clip for holding the vessel in the neck region and/or a holding base.

The filler tank 11 may be equipped with ultrasound outgassing 11a, which is disposed at the base of the filler tank 11 and set up to undertake or to assist degassing of the filling product by use of ultrasound.

The filling product is guided via a product conduit 14 from the filler tank 11 into the respective filling unit 13. The filling unit 13 comprises a filling valve, for example a proportional valve, in order to vary the flow rate of the filling product, i.e. to control the amount of filling product introduced into the vessel per unit time. Alternatively or additionally, a control valve or a barrier valve may be provided, which opens/closes an outlet 14a of the product conduit 14.

The apparatus 1 has a controller 100 set up to actuate the filling units 13, i.e. for switching of the filling valves. For this purpose, the controller 100 is in corresponding communication with the filling units. The controller is also in communication with other components of the apparatus 1, for example with sensors, valves, pumps etc., in order to control the processes performable with the apparatus 1 by open-loop or closed-loop control. The controller 100 may be decentralized or decentralized, may be part of Internet-based and/or cloud-based applications, or be implemented in some other way, and optionally have access to databases. The communication of the controller 100 with the corresponding components may be wireless or wired. The communication routes of the controller 100 with the corresponding components are not shown in the figures for the sake of clarity.

The apparatus 1 has a mixer 20 set up to produce the filling product by feeding in multiple filling product components in the correct ratio to one another. The mixer 20 also undertakes at least partial mixing of the filling product components—the mixing is partly also effected in the filler tank 11—and supplies the filling product to the filler tank 11.

The mixer 20 is, in one embodiment, above the filler 10, such that it is possible to utilize gravity in the supply of the filling product to the filler tank 11, and there is no need for the filling product components to be introduced into the circulation conduit 21 against a high hydrostatic pressure. Such a spatial arrangement between mixer 20 and filler 10 contributes to improvement of mixing accuracy of the filler product components.

The mixer 20 comprises a circulation conduit 21 that introduces the filling product into the filler tank 11 at a tank inlet 21a and draws off the filling product from the filler tank 11 at a tank outlet 21b, as a result of which the filling product is circulated in the circulation conduit 21 during the regular operation of the apparatus 1. The circulation conduit 21, especially the tank inlet 21a and tank outlet 21b thereof, is thus partly also within the filler 10.

By virtue of the filling product being in constant circulation via the circulation conduit 21, permanent mixing and homogenization of the filling product takes place with inclusion of the filler tank 11. In addition, the composition and quality of the filling product can be checked continuously and readjusted in the event of variances from the target state.

If the filler 10 is designed as a carousel-type machine, the circulation conduit 21 is guided via a rotary distributor 30 from the stationary part of the plant, i.e. the mixer 20, to the rotating part of the plant, i.e. the filler 10, and vice versa. The circulation conduit 21, in relation to the filler tank 11, has two arms referred to as circulation inlet 21c and circulation outlet 21d. The rotary distributor 30 is thus at least a two-stage rotary distributor, having at least two (three in the present embodiment) separate conduits or passages.

The mixer 20 has a circulation pump 22, which can be disposed in the circulation outlet 21d of the circulation conduit 20, i.e. between the tank outlet 21b and the feeds for the filling product components (described further down), and set up to convey the filling product in circulation in the circulation conduit 21. The circulation pump 22 controls the delivery output of the filling product in the circulation conduit 21. The circulation pump 22 may optionally be bypassed by means of a bypass valve 22a.

The various filling product components are introduced into the circulation conduit 21 via multiple dosage branches 23, 24 and 25. In the present working example, three dosage branches 23, 24, 25 are provided, and the number of these can be fixed suitably according to the application. The dosage branches 23, 24, 25 each have a dosage reservoir 23a, 24a, 25a that holds the corresponding dosage component. The dosage reservoirs 23a, 24a, 25a may be implemented as a tank or else as a feed for the corresponding component. The dosage branches 23, 24, 25 can each comprise a flowmeter 23b, 24b, 25b set up to measure the volume flow rate being conveyed or transported in the corresponding dosage branch 23, 24, 25 and to provide the data to the controller 100 for the open-loop or closed-loop control of the plant.

For the reasons mentioned above, the dosage branches 23, 24, 25, especially the openings thereof into the circulation conduit 21, are, in various embodiments, above the filler tank 11 or above the regular fill level, one reason being to minimize product losses.

A first dosage branch 23 may be set up for the feeding of a main component, for example water. The first dosage branch 23 may have a feed pump 23c in order to actively supply the main component to the circulation conduit 21. The feed pump 23c is actuated by the controller 100. The feed pump 23c is, in one embodiment designed as a centrifugal pump. However, depending on the application, it is optionally possible to dispense with the feed pump 23c and to replace it, for example, with a proportional valve, control valve or barrier valve that controls the feeding of the corresponding component.

A second dosage branch 24 may be set up for the feeding of a secondary component, for example syrup, pulp, flavouring etc. The second dosage branch 24 may include a dosage valve 24c, implemented, for example, as a proportional valve, control valve or barrier valve, in order to supply the secondary component to the circulation conduit 21 in the desired amount. The dosage valve 24c is actuated by the controller 100. However, according to the application, it is optionally possible to dispense with the dosage valve 24c and replace it, for example, with a dosage pump or feed pump. It is possible to provide further dosage branches 24 for the supply of one or more further secondary components.

A third dosage branch 25 may be set up for the supply of a gas component, especially $CO_2$ for carbonation of the filling product. The third dosage branch 25 may include a dosage valve 25c, implemented, for example, as a proportional valve, control valve or barrier valve, in order to supply the gas component to the circulation conduit 21 in the desired amount. The dosage valve 25c is actuated by the controller 100.

Further pumps may be provided in the circulation conduit 21, for example a further high-power pump 26 for control of the delivery output, may be installed between the openings of the first and second dosage branches 23, 24, and/or a pressure control pump 27, in one embodiment installed downstream of the third dosage branch 25. The pressure control pump 27 is, in one or more embodiments, a displacement pump, especially connected to a dosage of $CO_2$. The pressure control pump 27 is, in one embodiment, implemented as a centrifugal pump having a control valve for lowering the pressure.

A measurement branch 28 that can branch off the circulation outlet 21d opens into the circulation inlet 21c of the circulation conduit 21, bypassing the dosage branches 23, 24, 25. In one embodiment, a measurement branch pump 28a is provided in the measurement branch 28 in order to adjust the volume flow rate in the measurement branch 28, especially to keep it constant.

The measurement branch 28 has one or more sensors 28b in order to measure the composition of the filling product, the volume flow rate and/or other process properties. For example, it is possible to undertake a BRIX measurement in the filling product and a volume flow rate measurement to increase the mixing accuracy in the measurement branch 28. Alternatively or additionally, sensors 28c for the same purpose or another purpose may be installed between the third (=last) dosage branch 25 and the opening of the measurement branch 28.

Further sensors may be installed in the filling product conduits if required, for example before, i.e. upstream of, the first dosage branch 23, between two dosage branches 23, 24, 25 and/or directly within the filler tank 11. In the latter case, for quality assurance, it is possible to ascertain the composition of the filling product to be ultimately dispensed.

All sensors are in communication with the controller 100 in order to provide information for the closed-loop or open-loop control of the apparatus 1.

In addition, a dosage branch valve 29 may be provided downstream of, i.e. beyond, the branch of the measurement branch 28 in the circulation outlet 21d in order to be able to adjust the volume flow rate and/or to bypass the dosage branches 23, 24, 25 in their entirety.

In some embodiments, the mixer 20 has a heat exchanger 40 set up for cooling of the filling product, for example in the circulation inlet 21c, which improves, for example, the uptake of $CO_2$ if carbonated filling products are to be dispensed. In addition, the heat exchanger 40 may be utilized in order to heat a CIP medium during cleaning and/or sterilization in the context of a CIP application (described further down). The heat exchanger 40 is in some embodiments arranged downstream of the dosage branches 23, 24, 25 and downstream of the opening of the measurement branch 28 into the circulation inlet 21c and upstream of the rotary distributor 30.

During the regular operation of the apparatus 1, i.e. during a blending and dispensing process, the filling product components are introduced into the circulation conduit 21 in a desired mixing ratio via the dosage branches 23, 24, 25 and conveyed at a particular speed by means of the corresponding pumps 22, 26, 27. If the filler tank 11 has been emptied beforehand, the fill level rises gradually. During the circulation, the composition is monitored by the sensors 28b, 28c in order to ascertain changes and any variances from the desired formulation by means of the control unit 100 and if necessary to readjust it.

In the present integrated design of the apparatus 1, the filler tank 11 is the only buffer vessel for the filling product. The fill level in the filler tank may vary for various reasons, for instance in the event of a stoppage if the product quality is outside the formulation limits, at the end of production, or when the filler tank 11 runs empty. In the case of a filler 10 with a blow-moulding machine intended, for example, for the filling of polyethylene terephthalate (PET) bottles, the level in the filler tank 11 should be lowered on each stoppage to such an extent that the bottles already blown up in the system can still be filled. Otherwise, there would be high losses of bottles.

Fluctuations in fill level lead to a change in pressure in the filler tank 11, which can alter the filling speed. In order nevertheless to assure precise dispensing, the controller 100 is in various embodiments set up to undertake pressure control adapted to the fill level in the filler tank 11, such that the pressure is defined even in the case of a variable level or fill level, and especially remains constantly the same.

Alternatively, it is possible to undertake level-controlled filling, i.e. closed-loop control of the filling speed depending on the respective level in the vessel.

In order to facilitate the emptying of the filler tank 11, the controller 100 may be set up to exhaust the circulation conduit 21 with the main component, especially water, which can minimize product losses at the end of production.

In order to assure very efficient control of the mixer 20, the controller 100 is in several embodiments set up to conduct the dosage of the filling product components not with reference to current volume flow rates but via separate summation of the filling product components or of filling product parameters. For example, the amount of water and the amount of BRIX are added up separately, which forms different accounts for the individual filling product components or filling product parameters. The amount of syrup as an illustrative secondary component is then controlled such that the sum total corresponds to the desired ratio. At particular time intervals or on attainment of a particular sum total, the respective sum totals are reduced proportionately in accordance with the desired ratio. Such register control distinctly increases measurement accuracy since the differential for the closed-loop control can otherwise become very small relative to the sum total, as a result of which changes are possibly no longer recognized.

In addition to regular operation, the apparatus 1 according to the present working example permits CIP cleaning. The CIP ("cleaning in-place") method and SIP ("sterilization-in-place") method permit cleaning or sterilization of the mixer 20 and the filler 10, it being possible essentially to dispense with disassembly of the components and areas that come into contact with the filling product or the intermediates and auxiliaries. For example, the filling units 13 need not be deinstalled for the cleaning or sterilization; instead, they are purged or steamed with a cleaning medium or sterilization medium in the installed state.

For the sake of linguistic simplicity, the SIP method is encompassed herein by the CIP method, meaning that the CIP method includes cleaning and/or sterilization.

The apparatus 1, for performance of a CIP method, has a CIP device 50 that provides a CIP medium and can cause it to circulate for performance of the treatment, such that the surfaces to be cleaned or sterilized come into contact with the CIP medium. The CIP medium in one embodiment comprises water and/or alkali, for instance sodium hydroxide solution, and/or acid, for instance nitric acid and/or peracetic acid, and/or another disinfectant. It is also possible to utilize alcohols, for instance ethanol, alone or in combination as treatment medium. In addition, it is possible to use steam on its own or as carrier medium for sterilization.

The CIP device 50 has one or more CIP conduits 51 that introduce the CIP medium into the conduit system of the apparatus 1. In the present working example, the CIP medium is introduced via two CIP conduits 51 into the dosage reservoirs 23a, 24a, by means of which it passes via the dosage branches 23, 24 into the circulation conduit 21, the filler tank 11 and ultimately into the filling units 13.

The filling units 13 are equipped with CIP caps 13a that are set up on the vessel side and as required for closure of the outlets 14a of the filling units 13. For example, the CIP caps 13a may be moved in a rotary or linear manner beneath the respective outlets 14a and removed again after the CIP treatment has ended. The CIP medium is deflected at the outlets 14a by the CIP caps 13a and returned via a CIP return conduit 52 to the CIP device 50, such that the CIP medium circulates or can be made to circulate. For this purpose, there is in one embodiment a CIP pump 53 in the CIP return conduit 52.

However, the pumps 22, 26, 27 of the apparatus 1 may be used additionally or alternatively for the conveying of the CIP medium. In other words, the pumps 22, 26, 27 present in the apparatus 1 may be utilized synergetically as CIP recycling or circulation pump(s). The heat exchanger 40 may also be utilized synergetically in that it functions as heating device for the CIP medium during the CIP treatment.

The CIP return conduit 52 in the present working example is guided as a separate conduit through the rotary distributor 30, such that this is a three-stage rotary distributor 30.

The CIP conduit(s) 51 and/or CIP conduit(s) 52 may be equipped with CIP sensors in order to monitor the composition of the CIP medium.

Figure 2:
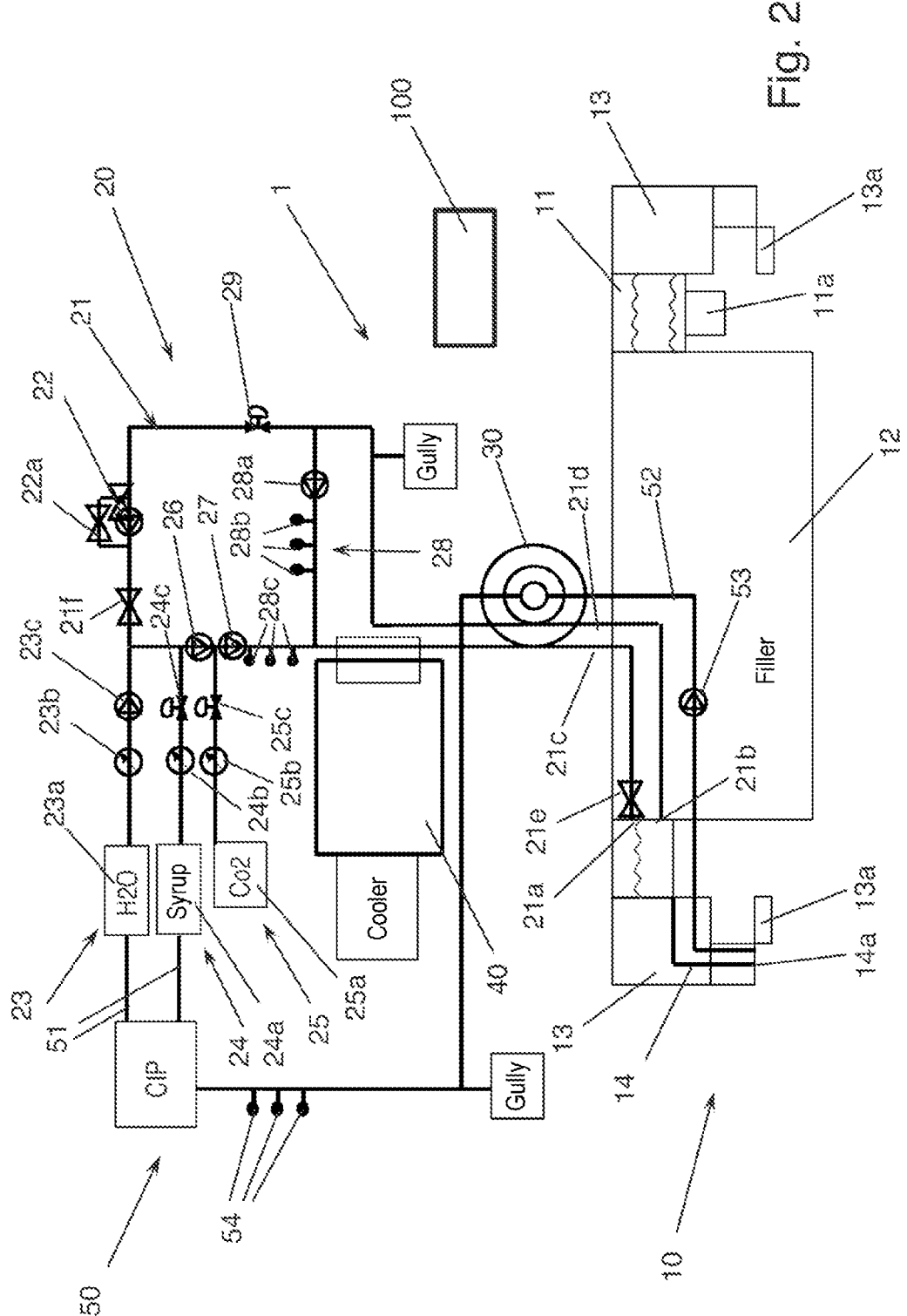
FIG. 2 is a schematic diagram of an apparatus for filling vessels with a multicomponent filling product in a further working example.
Figure 3:
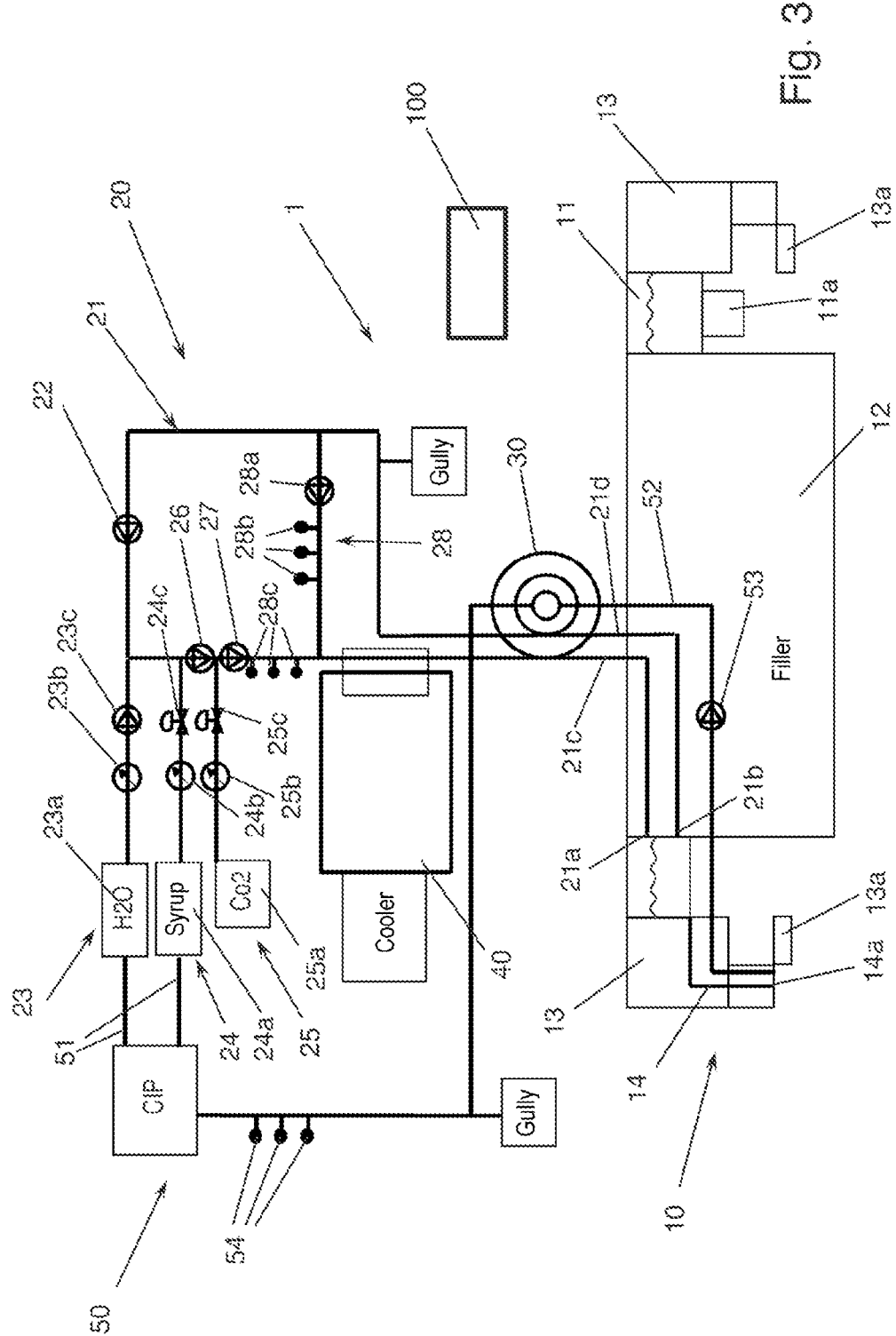
FIG. 3 is a schematic diagram of an apparatus for filling vessels with a multicomponent filling product in a further working example.

FIGS. 2 and 3 show further working examples of the apparatus 1 that are based on the working example of FIG. 1 and differ by the application and arrangement of valves.

For instance, according to FIG. 2, the circulation inlet 21c is equipped at the tank inlet 21a with a valve 21e, for example barrier valve, in order to be able to stop the supply of the filling product to the filler tank 11, for instance when product quality is outside the formulation limits. Alternatively or additionally, a further valve 21f may be installed between the circulation pump 22 and the first dosage branch 23, in order to separate the circulation inlet 21c and the circulation outlet 21d from one another.

In the working example of FIG. 3, the bypass valve 22a has been dispensed with.

The working examples of FIGS. 4 and 5 show that the circulation outlet 21d can function simultaneously as CIP return conduit 52, which means that the rotary distributor can be designed not as a three-stage rotary distributor 30 according to FIGS. 1 to 3 but as a two-stage rotary distributor 30'.

In the working example of FIG. 4, the CIP medium is recycled via the filler tank, in which case there is in some embodiments a valve installed at the tank outlet 21b of the circulation outlet 21d/CIP return conduit 52. The circulation pump 22 may be provided in the mixer-side section of the circulation outlet 21d/CIP return conduit 52, below (upstream of) the measurement branch 28.

In the working example of FIG. 5, the CIP medium and the filling product are circulated not via the filler tank 11 but via the filling unit 13.

If applicable, all individual features described in the working examples can be combined with one another and/or exchanged for one another without leaving the scope of the invention.

What is claimed is:

1. An apparatus for filling a vessel with a multicomponent filling product, comprising:
   a filler comprising:
      a filling unit configured to introduce the multicomponent filling product into the vessel, and
      a filler tank in fluid connection with the filling unit via a product conduit, and configured to intermediately buffer the multicomponent filling product and supply the filling unit with the multicomponent filling product; and
   a mixer configured to blend the multicomponent filling product from two filling product components,
   wherein:
   the mixer comprises:
      a circulation conduit that is in fluid connection with the filler tank at a tank inlet and at a tank outlet to enable the multicomponent filling product to circulate in regular operation,
      at least one dosage branch configured to introduce a filling product component from the two filling product components into the circulation conduit, and
      a heat exchanger configured to adjust a temperature of the multicomponent filling product in the circulation conduit,
   the mixer is further configured to feed the multicomponent filling product via the tank inlet to the filler tank and to draw the multicomponent filling product off from the filler tank via the tank outlet, and
   the mixer, when viewed in a direction of gravity, is disposed at least partly above the filler.

2. The apparatus of claim 1, wherein an opening of the at least one dosage branch into the circulation conduit is disposed above a fill level of the filler tank.

3. The apparatus of claim 1, wherein an opening of the at least one dosage branch into the circulation conduit is disposed above the filler tank.

4. The apparatus of claim 1, wherein the at least one dosage branch comprises at least two dosage branches.

5. The apparatus of claim 4, wherein the heat exchanger is disposed downstream of inlets of the at least two dosage branches into the circulation conduit and/or is configured to cool the multicomponent filling product.

6. The apparatus of claim 4, wherein the mixer further comprises a circulation pump that is disposed in the circulation conduit, the circulation pump is configured to circulate the multicomponent filling product in the circulation conduit, and the circulation pump is disposed upstream of inlets of the at least two dosage branches into the circulation conduit.

7. The apparatus of claim 4, wherein the mixer further comprises a pressure control pump disposed upstream of inlets of the at least two dosage branches into the circulation conduit, and the pressure control pump is implemented as a centrifugal pump with a control valve for lowering pressure.

8. The apparatus of claim 4, wherein the mixer further comprises one or more sensors configured to measure a composition of the multicomponent filling product in the circulation conduit and/or a volume flow rate, and the sensors are disposed downstream of inlets of the at least two dosage branches into the circulation conduit.

9. The apparatus of claim 4, wherein:
the mixer further comprises a measurement branch that branches off upstream of inlets of the at least two dosage branches into the circulation conduit, and bypassing the at least two dosage branches, opens back into the circulation conduit downstream of the inlets of the at least two dosage branches, and
the measurement branch comprises:
one or more sensors configured to measure a composition of the multicomponent filling product, and
a measurement branch pump configured to adjust a volume flow rate in the measurement branch.

10. The apparatus of claim 4, further comprising a controller in communication with the filler and the mixer, wherein the controller is configured to separately add up the two filling product components and/or filling product parameters and to control introduction of the two filling product components from the at least two dosage branches into the circulation conduit in such a way that a sum total of the two filling product components or the filling product parameters corresponds to an intended ratio or intended target values.

11. The apparatus of claim 10, wherein the controller is further configured to undertake pressure control in the filler tank according to a fill level in the filler tank such that a pressure defined by the controller exists in the filler tank and remains with variable fill levels.

12. The apparatus of claim 4, wherein the at least two dosage branches comprise three dosage branches.

13. The apparatus of claim 12, wherein a first dosage branch of the three dosage branches is configured to introduce a first component into the circulation conduit, a second dosage branch of the three dosage branches is configured to introduce a second component into the circulation conduit, and/or a third dosage branch of the three dosage branches is configured to introduce a gas component into the circulation conduit.

14. The apparatus of claim 13, wherein the first component comprises water, the second component comprises syrup, and the gas component comprises carbon dioxide.

15. The apparatus of claim 1, wherein the circulation conduit is in fluid connection with the filler tank at a plurality of tank inlets and/or at a plurality of tank outlets, and is configured to feed the multicomponent filling product to the filler tank at a plurality of points and/or to draw the filling product off from the filler tank at a plurality of points.

16. The apparatus of claim 1, further comprising a cleaning-in-place (CIP) device configured to provide a CIP medium and to circulate the CIP medium to enable product-guiding surfaces of the apparatus to come into contact with the CIP medium.

17. The apparatus of claim 16, wherein the mixer further comprises a circulation pump that is disposed in the circulation conduit and is further configured to convey the CIP medium.

18. The apparatus of claim 1, wherein:
the filler is designed as a carousel-type machine,
the mixer is further configured to be stationary relative to the filler, and
the circulation conduit is guided by a two-stage rotary distributor from the mixer to the filler tank and vice versa.

19. A method of filling a vessel with a multicomponent filling product, comprising:
blending the multicomponent filling product from two filling product components in a mixer, wherein the mixer comprises a circulation conduit in fluid connection with a filler tank of a filler at a tank inlet and at a tank outlet, and the mixer, when viewed in a direction of gravity, is disposed at least partly above the filler;
introducing the blended multicomponent filling product via the tank inlet of the circulation conduit into the filler tank;
intermediately buffering the multicomponent filling product in the filler tank;
drawing off the multicomponent filling product via the tank outlet from the filler tank;
feeding the multicomponent filling product from the filler tank to a filling unit via a product conduit;
introducing the multicomponent filling product via the filling unit into the vessel; and
adjusting a temperature of the multicomponent filling product in the circulation conduit via a heat exchanger.

20. An apparatus for filling a vessel with a multicomponent filling product, comprising:
a filler comprising:
a filling unit configured to introduce the multicomponent filling product into the vessel, and
a filler tank in fluid connection with the filling unit via a product conduit, and configured to intermediately buffer the multicomponent filling product and supply the filling unit with the multicomponent filling product; and
a mixer configured to blend the multicomponent filling product from two filling product components,
wherein:
the mixer comprises:
a circulation conduit that is in fluid connection with the filler tank at a tank inlet and at a tank outlet to enable the multicomponent filling product to circulate in regular operation,
a dosage branch configured to introduce a filling product component from the two filling product components into the circulation conduit, and
a heat exchanger configured to adjust a temperature of the multicomponent filling product in the circulation conduit,
the mixer is further configured to feed the multicomponent filling product via the tank inlet to the filler tank and to draw the multicomponent filling product off from the filler tank via the tank outlet, and
the mixer, when viewed in a direction of gravity, is disposed at least partly above the filler, and the mixer is designed without a buffer and is in fluid connection with the filler tank without a buffer.

* * * * *